United States Patent
Takahashi

(12) 
(10) Patent No.: US 9,625,981 B2
(45) Date of Patent: Apr. 18, 2017

(54) ELECTRONIC DEVICE AND VOLTAGE CONTROL METHOD

(71) Applicant: FUJITSU LIMITED, Kawasaki-shi, Kanagawa (JP)

(72) Inventor: Mitsunari Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 14/627,934

(22) Filed: Feb. 20, 2015

(65) Prior Publication Data

US 2015/0248155 A1    Sep. 3, 2015

(30) Foreign Application Priority Data

Mar. 3, 2014    (JP) ................. 2014-040787

(51) Int. Cl.
*G06F 1/32*    (2006.01)

(52) U.S. Cl.
CPC ........ *G06F 1/3287* (2013.01); *Y02B 60/1282* (2013.01)

(58) Field of Classification Search
CPC .... H02J 7/00; H04M 5/02; H01R 4/48; B60R 16/02; B60R 16/023; G06F 1/3215
See application file for complete search history.

(56) References Cited

U.S. PATENT DOCUMENTS

| | | | |
|---|---|---|---|
| 5,523,633 A | 6/1996 | Imaizumi et al. | |
| 7,870,408 B2 * | 1/2011 | Kirk | H03K 5/19 713/323 |
| 2012/0206414 A1 * | 8/2012 | Tada | G06F 1/1643 345/175 |
| 2014/0064512 A1 * | 3/2014 | Yu | H01R 24/58 381/74 |
| 2015/0228255 A1 * | 8/2015 | Takasu | G06F 1/325 345/659 |

FOREIGN PATENT DOCUMENTS

| | | |
|---|---|---|
| JP | 06-096637 A | 4/1994 |
| JP | 2000-182685 A | 6/2000 |
| JP | 2011-230652 A | 11/2011 |

* cited by examiner

*Primary Examiner* — Vincent Tran
(74) *Attorney, Agent, or Firm* — Maschoff Brennan

(57) ABSTRACT

An electronic device including an insertion portion for insertion of a connection terminal, includes a memory, and a processor coupled to the memory, configured to detect an acceleration when the electronic device is moved, detect whether or not the connection terminal is inserted in the insertion portion, based on a potential of a connection line with the insertion portion, and start application of voltage to the connection line when the detected acceleration varies from a value less than a threshold to a value equal to or greater than the threshold.

5 Claims, 7 Drawing Sheets

ELECTRONIC DEVICE AND VOLTAGE CONTROL METHOD

CROSS-REFERENCE TO RELATED APPLICATION

This application is based upon and claims the benefit of priority of the prior Japanese Patent Application No. 2014-040787, filed on Mar. 3, 2014, the entire contents of which are incorporated herein by reference.

FIELD

The embodiments discussed herein are related to electronic devices and voltage control methods.

BACKGROUND

Recently, electronic devices, such as smartphones and tablet terminals, have become widely used, and there has been an increasing demand to reduce failure rates. Some of the failures are bad contacts caused by rust and oxide films that are formed in terminal insertion portions such as switches and earphone jacks in electronic circuits.

As one technique for restraining bad contacts, for example, there is known a technique in which, at the time of turning on a switch, a current in the form of pulses is supplied to the switch to break an oxide film generated at a contact of the switch, so that a bad contact state of the switch contact is avoided. There is known another technique in which, at the time of connecting a terminal to a terminal insertion portion, rust is removed by rotating the terminal, so that a bad contact of the terminal is avoided. These techniques are disclosed in Japanese Laid-open Patent Publication No. 2011-230652, Japanese Laid-open Patent Publication No. 2000-182685, and Japanese Laid-open Patent Publication No. 6-096637.

SUMMARY

According to an aspect of the invention, an electronic device including an insertion portion for insertion of a connection terminal, includes a memory, and a processor coupled to the memory, configured to detect an acceleration when the electronic device is moved, detect whether or not the connection terminal is inserted in the insertion portion, based on a potential of a connection line with the insertion portion, and start application of voltage to the connection line when the detected acceleration varies from a value less than a threshold to a value equal to or greater than the threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, with the techniques described above, it is impractical to restrain rust or the like from being formed, and there is a limit to how much rust may be removed. These techniques are weak in terms of reducing the occurrence of bad contacts. For example, in the case of an earphone jack, the inner wall, which serves as an insertion portion, is continuously in a pull-up state, and rust due to the flow of electrons is continuously formed in the inner wall. The contact between an earphone and the earphone jack therefore becomes bad. This causes malfunctions such as non-recognition of an earphone and interruption of sound.

Hereinafter, embodiments of an electronic device and a voltage control method disclosed in the present application will be described in detail with reference to the accompanying drawings. It is to be noted that the present disclosure is not limited by the embodiments.

[First Embodiment]
[Overall Configuration Example]

Figure 1:
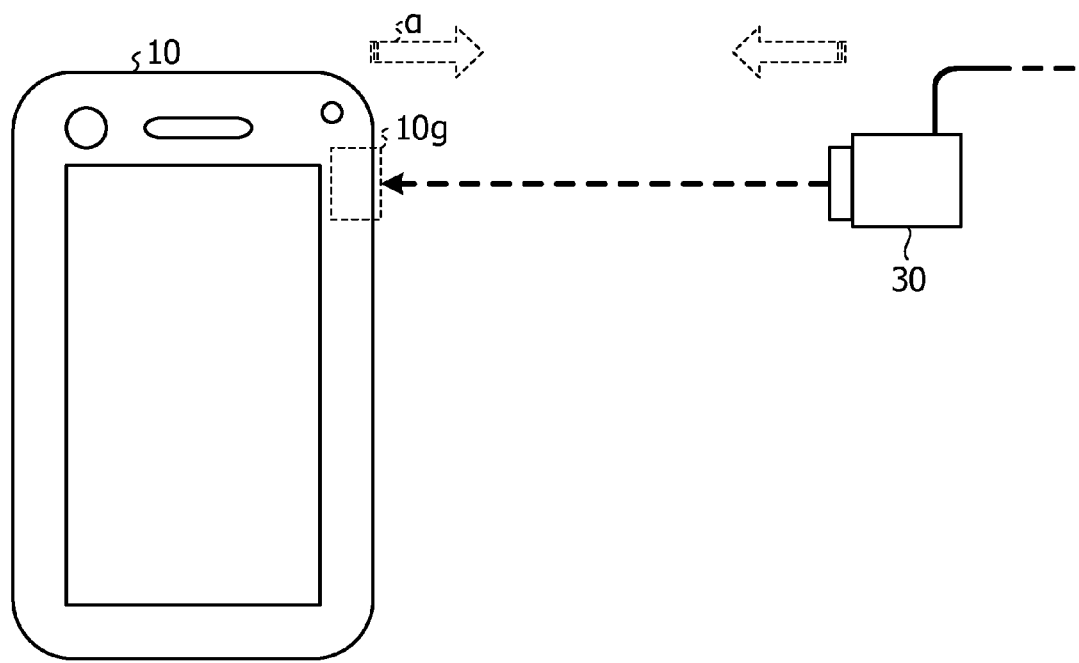
FIG. 1 is a diagram illustrating a mobile phone according to a first embodiment.

FIG. 1 is a diagram illustrating a mobile phone according to a first embodiment. Here, an example of a mobile phone is described. This embodiment is not limited to this, and may be applied similarly to, for example, terminals such as smart phones, and portable music players.

As illustrated in FIG. 1, a mobile phone 10 includes a storage unit that stores music data, a controller that reproduces music data, and so forth. When an earphone 30 is inserted into an earphone jack 10g, the mobile phone 10 reproduces music data and outputs it to the earphone 30.

The mobile phone 10 having such a configuration includes the earphone jack 10g for insertion of the earphone 30, and detects an acceleration a when the mobile phone 10 is moved. Then, the mobile phone 10 is electrically connected to the earphone jack 10g, and, based on the potential of a connection line, detects whether or not the earphone 30 is inserted in the earphone jack 10g. In contrast, when the detected acceleration a is equal to or greater than a threshold, the mobile phone 10 starts applying voltage to the earphone jack 10g.

Accordingly, when the mobile phone 10 is moved at an acceleration equal to or greater than a threshold, a detection voltage is applied to the earphone jack 10g. When insertion of an earphone is not detected, application is stopped. As a result, the mobile phone 10 suppresses the formation of rust caused by continuously applying voltage. This decreases the occurrence of bad contacts.

[Hardware Configuration]

Figure 2:
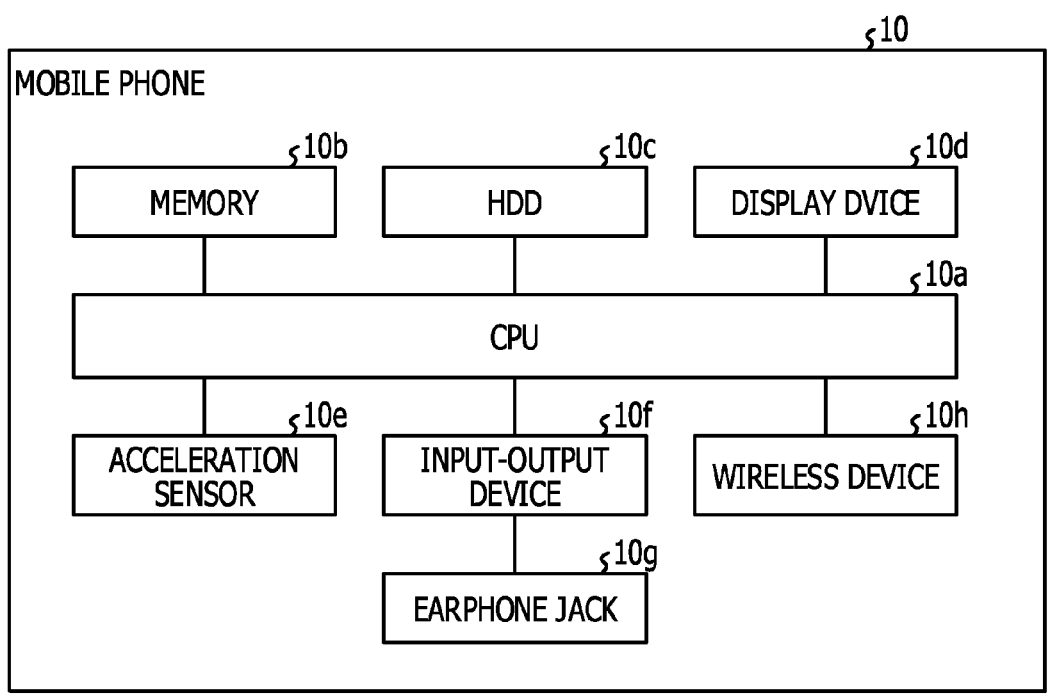
FIG. 2 is a diagram illustrating an example of a hardware configuration of the mobile phone according to the first embodiment.

FIG. 2 is a diagram illustrating an example of a hardware configuration of a mobile phone according to the first embodiment. As illustrated in FIG. 2, the mobile phone 10 includes a central processing unit (CPU) 10a, a memory 10b, a hard disk drive (HDD) 10c, a display device 10d, an acceleration sensor 10e, and an input-output device 10f, an earphone jack 10g, and a wireless device 10h. Note that hardware items illustrated here are examples, and, in addition to these items, a camera, a temperature sensor, a location information acquisition sensor, and so forth may be included.

The CPU 10a executes various programs, such as an operating system (OS) and application programs. For example, the CPU 10a reads, from the HDD 10c, programs having functions similar to processing units described with reference to FIG. 3 and other drawings, and arranges the programs in the memory 10b. Then, the CPU 10a executes processes that perform processing similar to each processing unit.

The memory 10b includes a read only memory (ROM) in which an OS and application programs are stored, a random access memory (RAM) used as an operation area of the CPU 10a, and so forth.

The HDD 10c is a storage device that stores a database and so forth, and stores various programs executed by, for example, the CPU 10a. The display device 10d is a display device on which results obtained by execution of various programs by the CPU 10a are displayed with characters and images. The display device 10d functions as a touch panel, and also functions as a pointing device when used together with a keyboard or the like.

The acceleration sensor 10e is a sensor capable of measuring a speed variation value during a certain period of time, and measures an acceleration when the mobile phone 10 is moved. The input-output device 10f controls input of a voice from a microphone, output of sound to a receiver, output of sound to a speaker, and input and output of sound with the earphone jack 10g.

The earphone jack 10g is a connector for insertion of an earphone when sound is output via the earphone. In the case where sound is input via an earphone with a microphone, the earphone jack 10g may be a connector for insertion of sound through the earphone with a microphone.

The wireless device 10h performs transmission and reception of sound data or electronic mail via a base station. The wireless device 10h may control communication with an external device at a close distance, without using a base station. For example, the wireless device 10h is a device with an interface of infrared transmission, Bluetooth (registered trademark), or FeliCa (registered trademark). The wireless device 10h may communicate with an access point of a wireless fidelity (Wi-Fi (registered trademark)) system through wireless communication.

[Functional Configuration]

Figure 3:
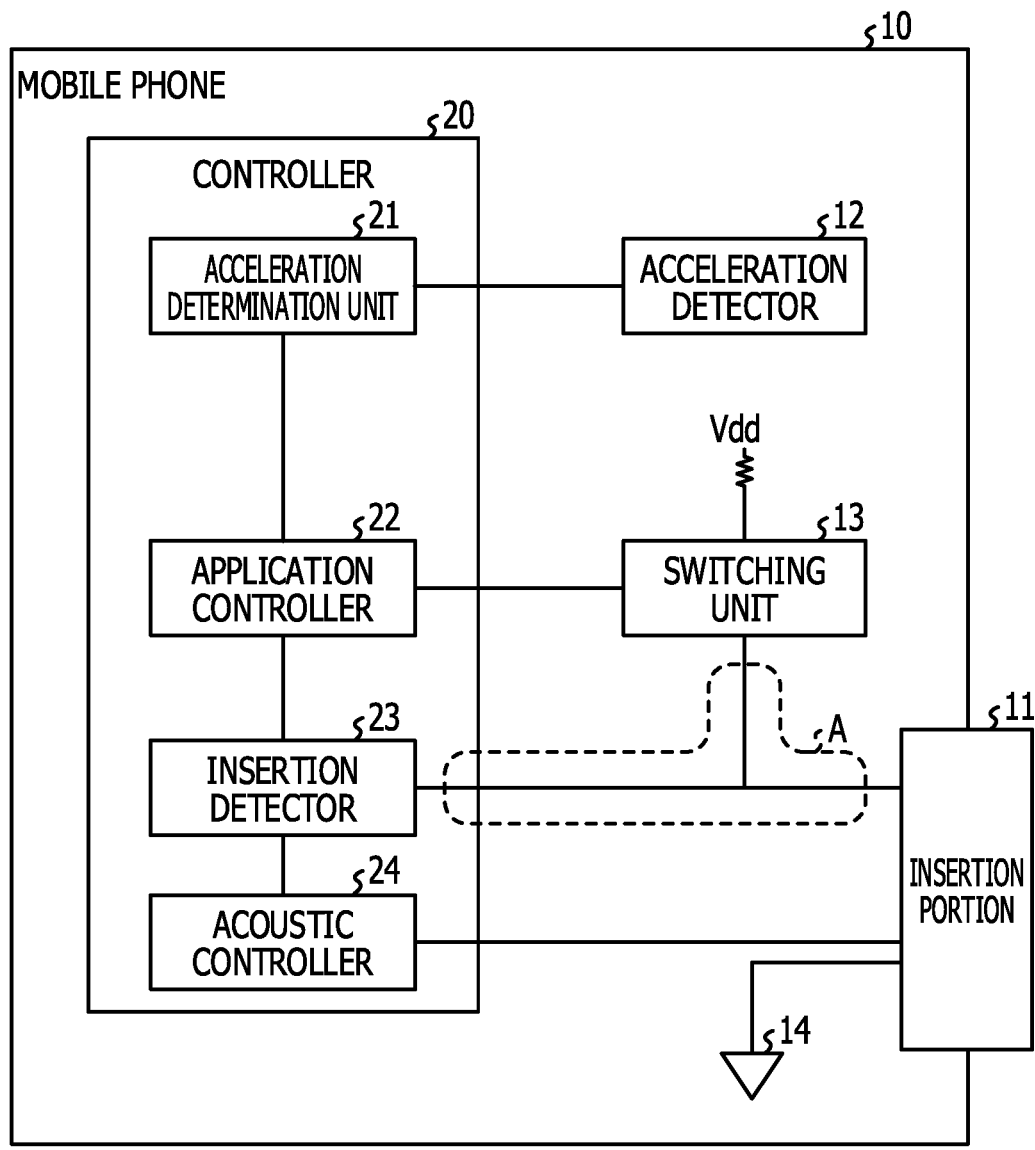
FIG. 3 is a functional block diagram illustrating a functional configuration of the mobile phone according to the first embodiment.

FIG. 3 is a functional block diagram illustrating a functional configuration of the mobile phone according to the first embodiment. As illustrated in FIG. 3, the mobile phone 10 includes an insertion portion 11, an acceleration detector 12, a switching unit 13, and a controller 20.

The insertion portion 11 is a processing unit for insertion of a connection terminal such as that of an earphone, and is an example of the earphone jack 10g illustrated in FIG. 2. The insertion portion 11 is connected to the insertion detector 23 and the switching unit 13, and is connected to the ground 14. Note that, in addition to voltage for detection of a connection terminal, power from the mobile phone 10 itself is supplied to the insertion portion 11.

The acceleration detector 12 is a processing unit that detects an acceleration when the mobile phone 10 is moved, and is an example of the acceleration sensor 10e illustrated in FIG. 2. The acceleration detector 12 outputs the detected acceleration to an acceleration determination unit 21 of the controller 20.

The switching unit 13 is a switching processing unit that controls application of a power supply voltage Vdd to the insertion portion 11, and is an example of a pull-up resistor. For example, upon receipt of an instruction for application from an application controller 22, the switching unit 13 connects the power voltage Vdd with the insertion portion 11, and starts applying the power voltage Vdd to the insertion portion 11. As a result, the voltage of the switching unit 13, the insertion detector 23, and the insertion portion 11 is in a High state. Note that, in this embodiment, a connection portion for connecting the switching unit 13, the insertion detector 23, and the insertion portion 11 is sometimes denoted as a node A.

Additionally, upon receipt of an instruction for stopping application of voltage from the application controller 22, the switching unit 13 cuts off the flow between the power voltage Vdd and the insertion portion 11 to stop applying the power voltage Vdd to the insertion portion 11. As a result, the voltage of the node A is in an undefined potential state.

The controller 20 includes the acceleration determination unit 21, the application controller 22, the insertion detector 23, and an acoustic controller 24. With these units, the application of connection terminal detection voltage to the insertion portion 11 is controlled. The controller 20 is an example of the CPU 10a illustrated in FIG. 2, and each processing unit is an example of an electronic circuit included in the CPU 10a or a process executed by the CPU 10a.

The acceleration determination unit 21 is a processing unit that determines whether or not an acceleration detected by the acceleration detector 12 exceeds a threshold. For example, when an acceleration a is detected, the acceleration determination unit 21 determines whether or not the acceleration a is equal to or greater than a threshold $\beta$. Then, when it is determined that the acceleration a is equal to or greater than the threshold $\beta$, the acceleration determination unit 21 outputs, to the application controller 22, a signal or the like indicating that the acceleration equal to or greater than the threshold $\beta$ has been detected.

The application controller 22 is a processing unit that controls switching of the switching unit 13. Specifically, when an acceleration detected by the acceleration determination unit 21 varies from a value less than a threshold to a value equal to or greater than the threshold, the application controller 22 starts applying voltage to a connection line to which the insertion portion 11 is connected.

For example, upon receipt of a signal or the like indicating an acceleration equal to or greater than a threshold from the acceleration determination unit 21, the application controller 22 outputs, to the switching unit 13, an instruction for starting voltage application. Thereafter, when receiving, from the insertion detector 23, a signal indicating that a connection terminal is connected to the insertion portion 11, the application controller 22 maintains a state where the switching unit 13 applies voltage. In contrast, when not receiving, from the insertion detector 23, a signal indicating that a connection terminal is connected to the insertion portion 11, the application controller 22 outputs, to the switching unit 13, an instruction that instructs stoppage of voltage application.

The insertion detector 23 is a processing unit that detects insertion of a connection terminal to the insertion portion 11. Specifically, the insertion detector 23 is electrically connected to the insertion portion 11, and, based on a potential of a connection line to the insertion portion 11, detects whether or not the connection terminal is inserted in the insertion portion 11. That is, the insertion detector 23 detects whether or not the earphone 30 has been inserted into the earphone jack 10g.

For example, when the voltage of the node A is High, the insertion detector 23 detects that a connection terminal has not yet been inserted. Then, the insertion detector 23 outputs, to the application controller 22 and the acoustic controller 24, a signal indicating that a connection terminal has not yet been inserted.

In contrast, when the voltage of the node A is Low, the insertion detector 23 detects that a connection terminal has been inserted. Then, the insertion detector 23 outputs, to the application controller 22 and the acoustic controller 24, a signal indicating that a connection terminal is in an inserted state.

That is, upon detection of an acceleration equal to or greater than a threshold, the switching unit 13 enters an on-state to apply voltage to the node A. Thus, the voltage of the node A changes to High. When, in this situation, a connection terminal is inserted into the insertion portion 11, the voltage of the node A is drawn through the insertion portion 11 by the ground 14 and thus changes to Low.

Consequently, when the switching unit 13 is in the on-state and the node A is Low, the insertion detector 23 detects that a connection terminal is inserted in the insertion portion 11. When the switching unit 13 is in the on-state and the node A is High, the insertion detector 23 detects that a connection terminal is not inserted in the insertion portion 11.

The acoustic controller 24 is a processing unit that reproduces music data. For example, when reproducing music data in a situation where the acoustic controller 24 has received, from the insertion detector 23, a signal indicating that a connection terminal is in an inserted state, the acoustic controller 24 outputs sound to the inserted connection terminal. Note that, when reproducing music data in a situation where the acoustic controller 24 has received, from the insertion detector 23, a signal indicating that a connection terminal is not in an inserted state, the acoustic controller 24 outputs sound to a speaker or the like that is not illustrated.

[Flow of Processing]

Figure 4:
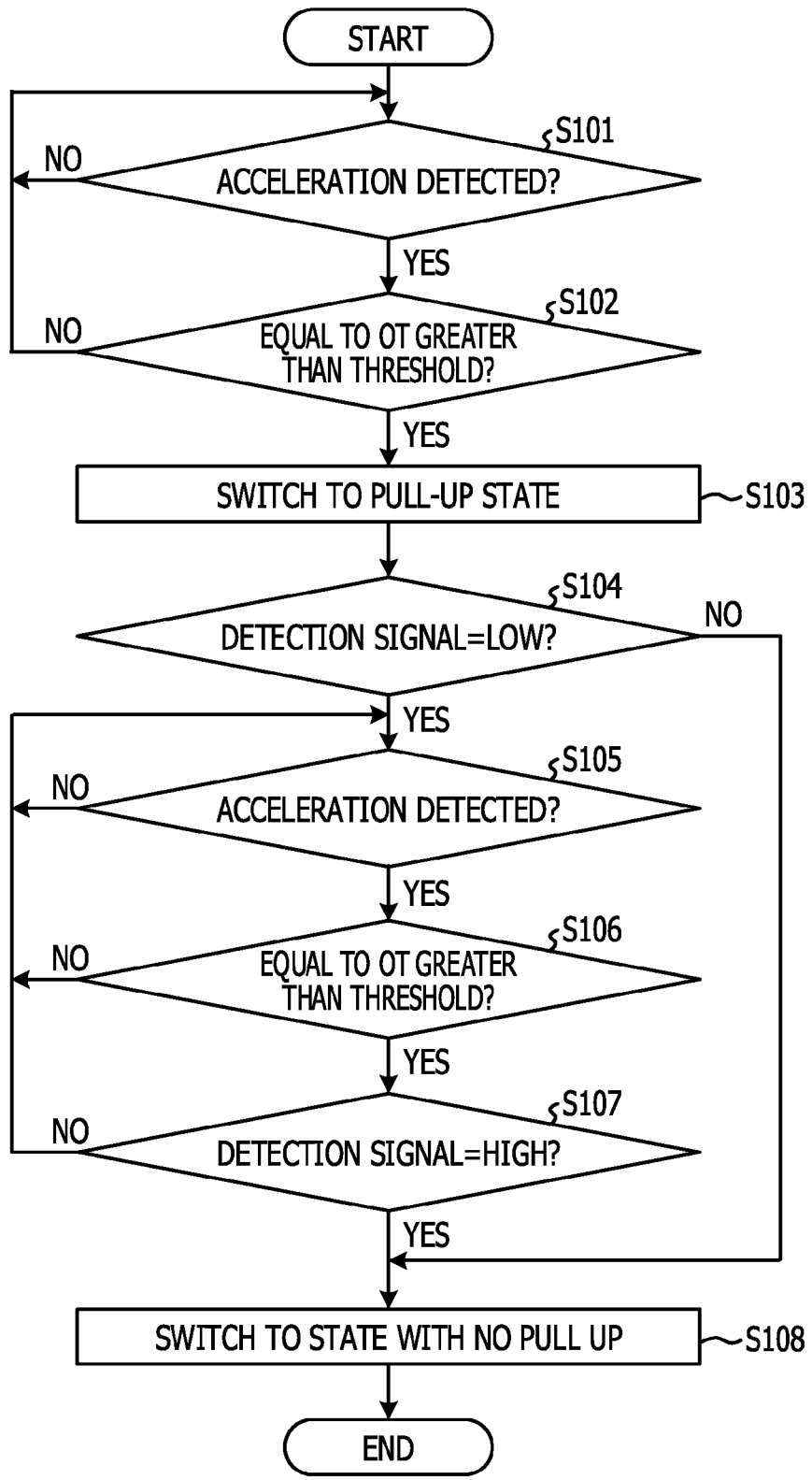
FIG. 4 is a flowchart illustrating a flow of voltage control processing according to the first embodiment.

FIG. 4 is a flowchart illustrating a flow of voltage control processing according to the first embodiment. As illustrated in FIG. 4, upon detection of an acceleration (S101: Yes), the mobile phone 10 determines whether or not the detected acceleration is equal to or greater than a threshold (S102).

Subsequently, when the detected acceleration is equal to or greater than the threshold (S102: Yes), the mobile phone 10 causes the switching unit 13 to enter the on-state, applying voltage to the node A to perform switching to a pull-up state (S103).

Then, when the detection signal of a connection terminal detected by the insertion detector 23 is Low, that is, when the voltage of the node A is Low (S104: Yes), the mobile phone 10 determines that the connection terminal is connected, and maintains voltage application.

Thereafter, upon detection of an acceleration (S105: Yes), the mobile phone 10 determines whether or not the detected acceleration is equal to or greater than the threshold (S106).

Then, when the detected acceleration is equal to or greater than the threshold (S106: Yes), the mobile phone 10 determines whether or not the detection signal of a connection terminal detected by the insertion detector 23 is High, that is, whether or not the voltage of the node A is High (S107).

Then, when the detection signal of a connection terminal is High (S107: Yes), the mobile phone 10 determines that the connection terminal has been removed, and performs switching to a state where there is no pull up (hereinafter referred to as a "state with no pull up") (S108). That is, the mobile phone 10 causes the switching unit 13 to enter the off-state to stop application of voltage to the node A.

On the other hand, in S104, when a detection signal of a connection terminal detected by the insertion detector 23 is High (S104: No), the mobile phone 10 determines that the connection terminal is not connected, and performs switching to the state with no pull up (S108).

When no acceleration is detected in S105 (S105: No), when, in S106, the acceleration is less than the threshold (S106: No), and when, in S107, the detection signal of a connection terminal is Low (S107: No), the mobile phone 10 repeats the steps in and after S105.

[Processing Transition]

Figure 5:
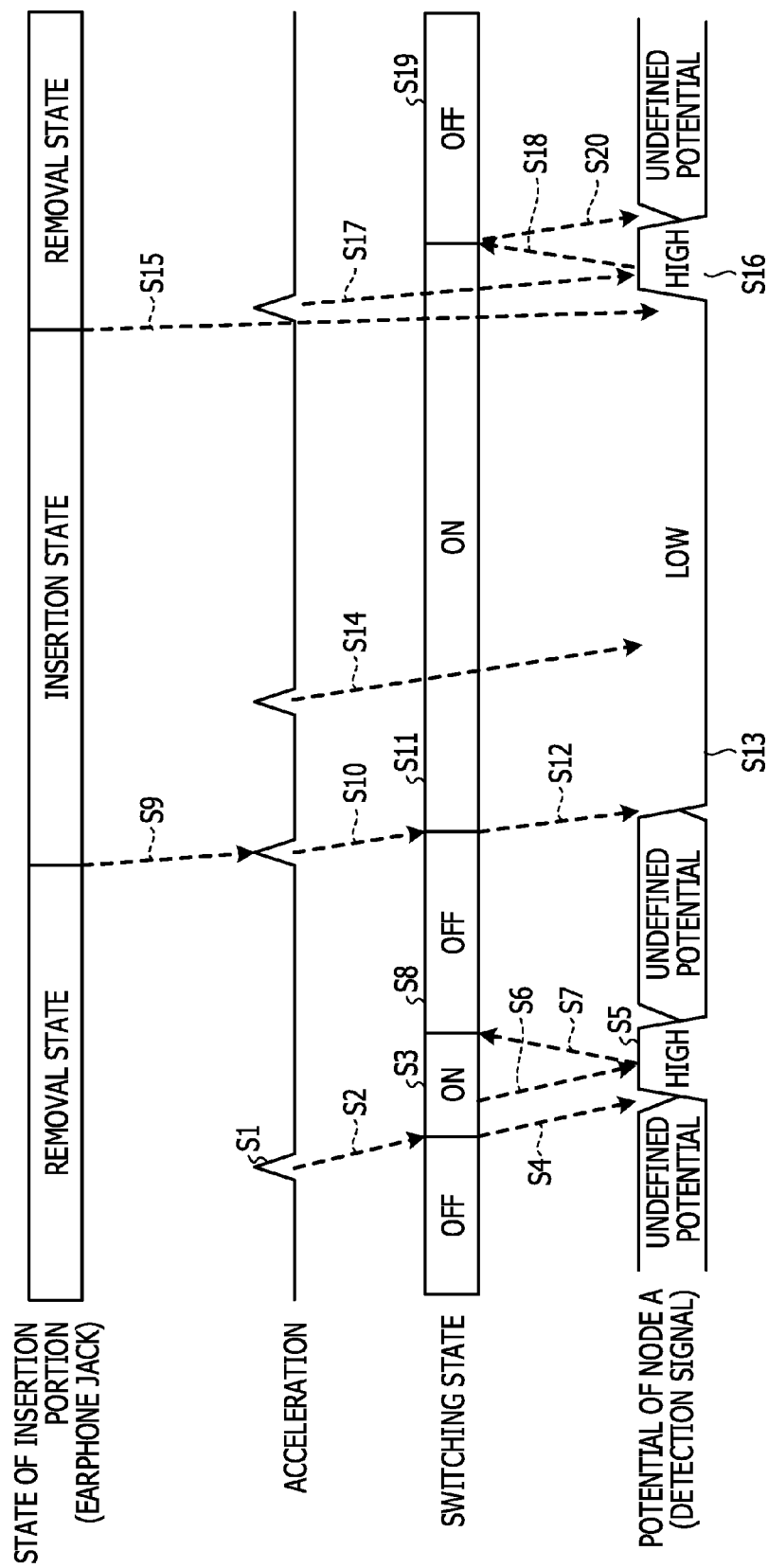
FIG. 5 is a diagram illustrating steps of processing of voltage control according to the first embodiment.

FIG. 5 is a diagram illustrating the steps of processing of voltage control according to the first embodiment. As illustrated in FIG. 5, upon detection of an acceleration equal to or greater than a threshold (S1), the mobile phone 10 causes the switching state to enter an on-state (S2 and S3). Then, since the switching state is changed to the on-state, the pull-up state is entered (S4) and the potential of the node A changes from an undefined potential to High (S5).

Then, upon detection of the potential of the node A being High (S6), the mobile phone 10 determines that an earphone jack is not connected, and causes the switching state to transition to an off-state (S7 and S8).

Further, after an elapse of a given time, as the mobile telephone 10 detects insertion of an earphone jack (S9), the mobile telephone 10 detects an acceleration equal to or greater than the threshold and changes the switching state from the off-state to the on-state (S10 and S11).

Then, since the switching state is changed to the on-state, the pull-up state is entered (S12). The potential is drawn by the ground as the earphone jack is inserted. Thus, the potential of the node A changes from an undefined potential to Low (S13). That is, in the mobile phone 10, while the earphone jack is inserted in the mobile phone 10, the pull-up state is maintained and voltage continues to be applied to the node A.

Further, after an elapse of a given time, the mobile phone 10 detects an acceleration equal to or greater than the threshold (S14). Since the potential of the node A is Low, the switching state is not changed to the off-state.

Further, after an elapse of a given time, the mobile phone 10 detects removal of the earphone jack (S15). As a result, only a pulled-up potential is applied to the node A, and thus the potential of the node A rises to High (S16).

Additionally, as the earphone jack is removed, the mobile phone 10 detects an acceleration equal to or greater than the threshold (S17). Further, the mobile phone 10 detects that the potential of the node A is High (S18) and thus changes the switching state from the on-state to the off-state (S19). As a result, potential application to the node A is stopped, and thus the potential of the node A changes to an undefined potential (S20).

[Advantages]

In such a way, although, in a normal situation, a signal for detection of insertion of an earphone (hereinafter referred to as an "earphone-insertion detection signal") is in the state with no pull up, the mobile phone 10 switches the earphone-insertion detection signal to the pull-up state when detecting that an acceleration exceeds the threshold. Thereafter, the mobile phone 10 determines whether the level of the earphone-insertion detection signal is Low or High, and thus operates so as to inhibit insertion from being wrongly detected.

Further, under a condition where an earphone is inserted, when it is detected that the acceleration exceeds the threshold, the mobile phone 10 determines whether the level of the earphone-insertion detection signal is High or Low, and thus operates so as to inhibit insertion from being wrongly detected. Additionally, when removal is positively detected, the mobile phone 10 operates so as to switch the earphone-insertion detection signal to the state with no pull up, that is, the normal situation.

Consequently, the inner wall of the earphone jack 10*g* of the mobile phone 10 is not continuously in the pull-up state, which enables formation of rust due to the flow of electrons to be reduced. As a result, malfunctions due to bad contact between the earphone 30 and the earphone jack 10*g* may be inhibited, which, in turn, may provide a mobile phone with high reliability.

[Second Embodiment]

The example where voltage is continuously applied to the node A while the earphone 30 is inserted has been described in the first embodiment. However, the present disclosure is not limited to this. Voltage application to the node A may be controlled until the earphone 30 is removed.

Accordingly, in a second embodiment, an example where voltage application to the node A is controlled in a period of time from insertion of the earphone 30 to its removal.

[Flow of Processing]

Figure 6:
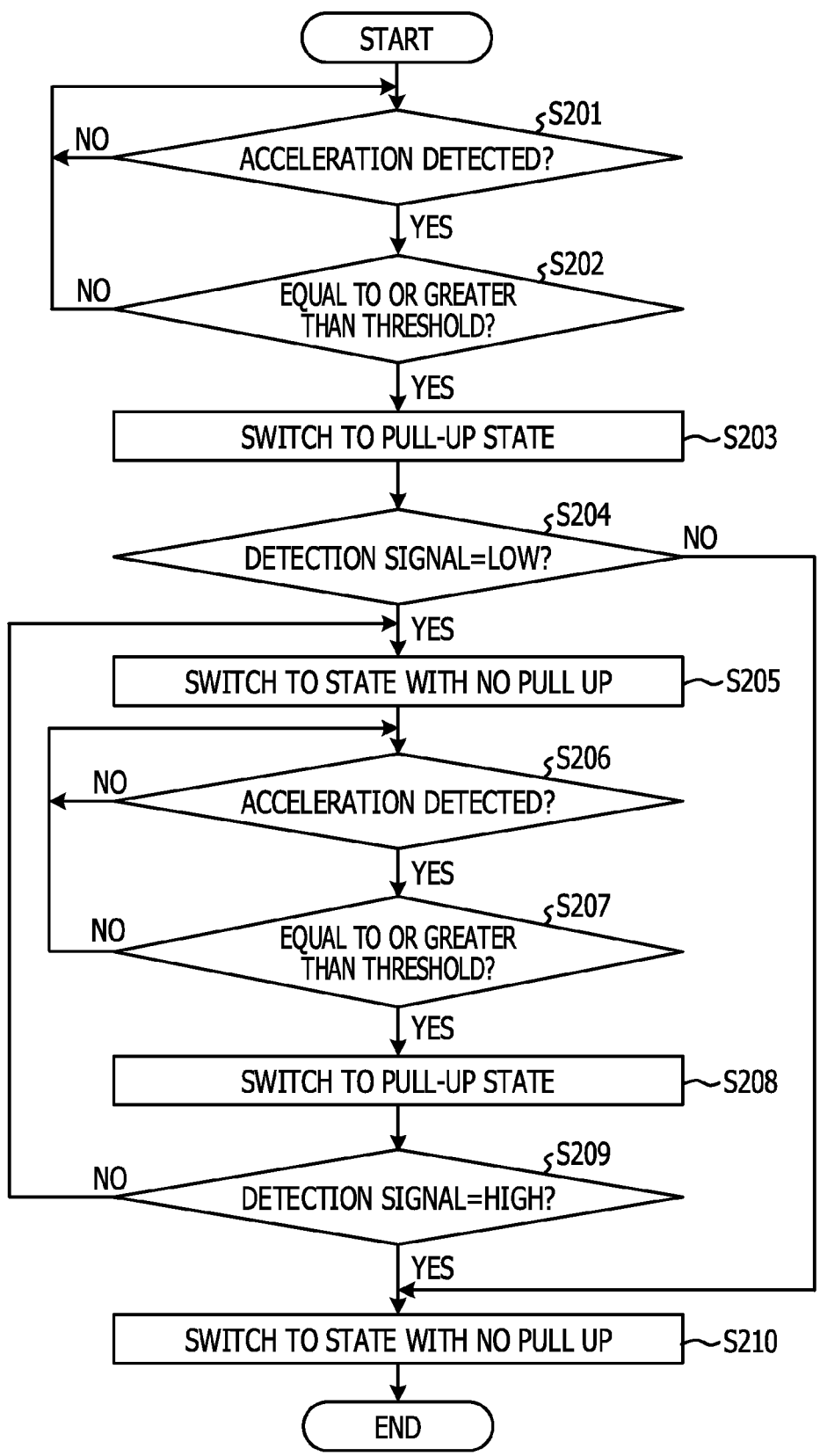
FIG. 6 is a flowchart illustrating a flow of voltage control processing according to a second embodiment.

FIG. 6 is a flowchart illustrating a flow of voltage control processing according to the second embodiment. As illustrated in FIG. 6, upon detection of an acceleration (S201: Yes), the mobile phone 10 determines whether or not the detected acceleration is equal to or greater than a threshold (S202).

Subsequently, when the detected acceleration is equal to or greater than the threshold (S202: Yes), the mobile phone 10 causes the switching unit 13 to enter the on-state, applying voltage to the node A to perform switching to the pull-up state (S203).

Then, when the detection signal of the connection terminal detected by the insertion detector 23 is Low (S204: Yes), the mobile phone 10 determines that connection of the connection terminal has been detected, and performs switching to the state with no pull up (S205). That is, the mobile phone 10 causes the switching unit 13 to enter the off-state to stop application of voltage to the node A.

Thereafter, upon detection of an acceleration (S206: Yes), the mobile phone 10 determines whether or not the detected acceleration is equal to or greater than the threshold (S207).

Then, when the detected acceleration is equal to or greater than the threshold (S207: Yes), the mobile phone 10 causes the switching state to enter the on-state, and performs switching to the pull-up state (S208).

Thereafter, when the detection signal of the connection terminal detected by the insertion detector 23 is High (S209: Yes), the mobile phone 10 determines that the connection terminal has been removed, and performs switching to the state with no pull up (S210). That is, the mobile phone 10 causes the switching unit 13 to enter the off-state to stop application of voltage to the node A.

On the other hand, in S204, when the detection signal of the connection terminal detected by the insertion detector 23 is High (S204: No), the mobile phone 10 determines that the connection terminal is not connected, and performs switching to the state with no pull up (S210).

When no acceleration is detected in S206 (S206: No), and when, in S207, the acceleration is less than the threshold (S207: No), the mobile phone 10 repeats steps in and after S206. When, in S209, the detection signal of the connection terminal is Low (S209: No), the mobile phone 10 repeats steps in and after S205.

[Processing Transition]

Figure 7:
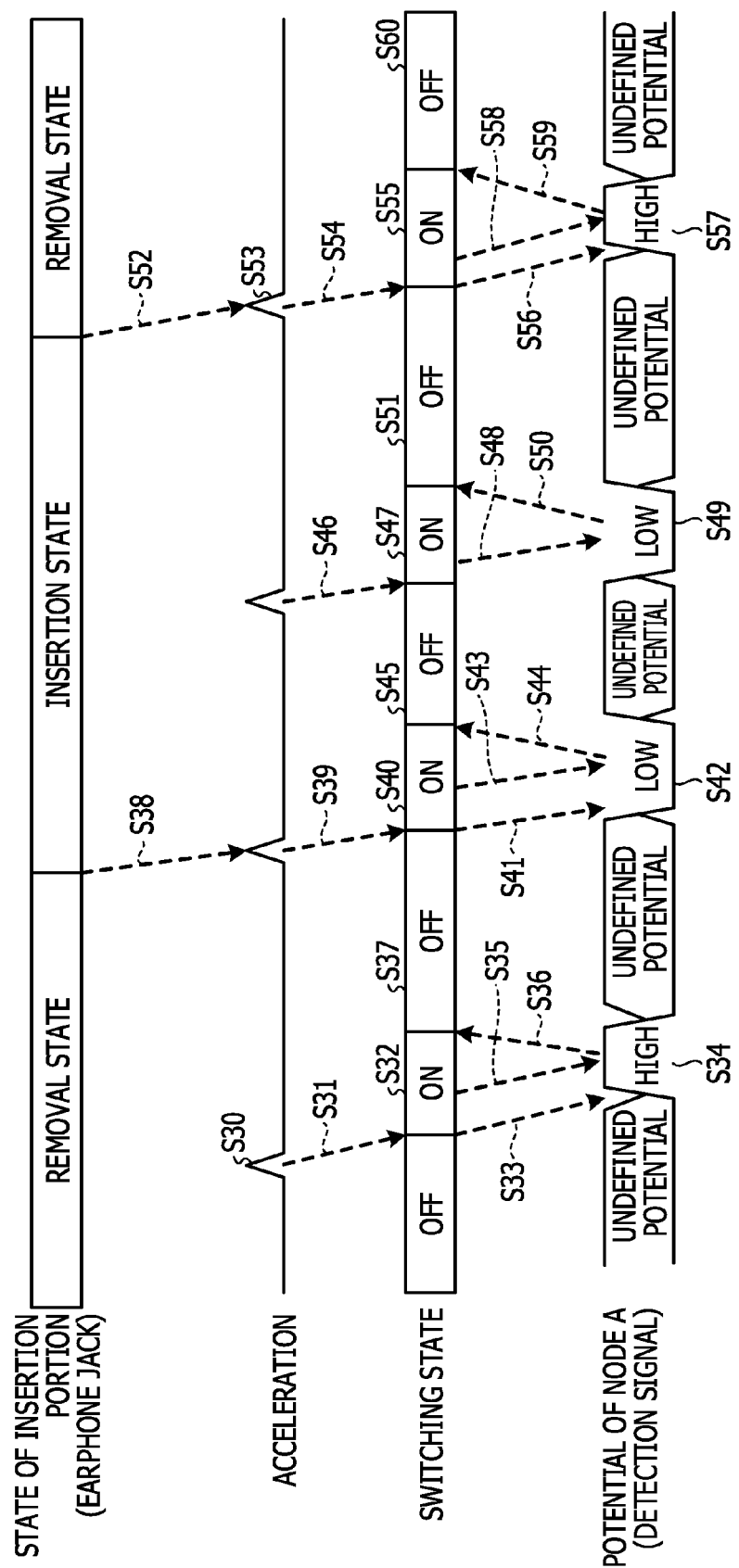
FIG. 7 is a diagram illustrating steps of processing of voltage control according to the second embodiment.

FIG. 7 is a diagram illustrating the steps of processing of voltage control according to the second embodiment. As illustrated in FIG. 7, upon detection of an acceleration equal to or greater than a threshold (S30), the mobile phone 10 causes the switching state to enter an on-state (S31 and S32). Then, since the switching state is changed to the on-state, the pull-up state is entered (S33) and the potential of the node A changes from an undefined potential to High (S34).

Then, upon detection of the potential of the node A being High (S35), the mobile phone 10 determines that an earphone jack is not connected, and causes the switching state to transition to an off-state (S36 and S37).

Further, after an elapse of a given time, as the mobile telephone 10 detects insertion of an earphone jack (S38), the mobile telephone 10 detects an acceleration equal to or greater than the threshold and changes the switching state from the off-state to the on-state (S39 and S40).

Then, since the switching state is changed to the on-state, the pull-up state is entered (S41). The potential is drawn by the ground as the earphone jack is inserted. Thus, the potential of the node A changes from an undefined potential to Low (S42). Subsequently, since the potential of the node A is in the Low state, the mobile phone 10 detects insertion of an earphone (S43 and S44), and changes the switching state to the off-state (S45). As a result, potential application to the node A is stopped, and thus the potential of the node A changes to an undefined potential.

Further, after an elapse of a given time, the mobile phone 10 detects an acceleration equal to or greater than the threshold (S46). The potential of the node A is Low, and thus the switching state is changed to the on-state (S47).

However, since the potential of the node A is Low, the mobile phone 10 determines that the potential of the earphone 30 is not inserted and that the earphone 30 is wrongly detected (S48 to S50), and thus changes the switching state to the off-state (S51). As a result, voltage application to the node A is stopped again, and thus the potential of the node A changes to an undefined potential.

Further, after an elapse of a given time, as removal of an earphone jack is detected (S52), the mobile phone 10 detects an acceleration equal to or greater than the threshold (S53), and changes the switching state to the on-state (S54 and S55). Then, since the switching state is changed to the on-state, the pull-up state is entered (S56). Only a pulled-up potential is applied to the node A. Thus, the potential of the node A changes from the undefined potential to High (S57).

Subsequently, upon detection of the potential of the node A being High (S58), the mobile phone 10 determines that the earphone jack is not connected, and causes the switching state to transition to the off-state (S59 and S60).

[Advantages]

In such a way, the mobile phone 10 continuously sets the earphone-insertion detection signal to the state with no pull up, unless an acceleration equal to or greater than a given threshold is detected during insertion of an earphone. As a result, when soaked with water during insertion of an earphone, the mobile phone 10 may inhibit failure of the mobile phone 10 caused by high current flowing into the inside of the mobile phone 10.

[Third Embodiment]

Although the embodiments of the present disclosure have been described, the present disclosure may be carried out in various forms other than the embodiments described above.

[Examples of Electronic Device]

In the above embodiments, description has been given of the example of the mobile phone 10. However, the present disclosure is not limited to this, and may be similarly applied to electronic devices that allow for connection with external terminals, for example, terminals, such as smartphones, and portable music players.

[Examples of Insertion Portion]

In the above embodiments, description has been given of the examples of the earphone jack 10g. However, the present disclosure is not limited to this, and may be similarly applied to insertion portions in any forms if the insertion portions are those for insertion of external connection terminals, such as insertion portions of microphones.

[System Configuration and Others]

Additionally, it is unnecessary that the illustrated devices have physical configurations as illustrated. That is, the devices may be configured such that they are distributed or unified in arbitrary units. Furthermore, regarding processing functions performed in the devices, the whole or any part of them may be implemented by CPUs or by programs analyzed and executed by the CPUs, or may be implemented as hardware using wired logic.

Additionally, among processes described in the embodiments, the whole or any part of the processes described as those performed automatically may be performed manually, or the whole or any part of the processes described as those performed manually may be performed automatically using known methods. In addition, information including processing procedures, control procedures, specific names, and various kinds of data and parameters illustrated in the documents described above and in the drawings may be arbitrarily changed, except for cases specially mentioned.

It is to be noted that the mobile phone 10 described in the embodiments reads and executes a voltage control program, and thus may perform functions similar to those described with reference to FIG. 3 and other drawings. For example, the mobile phone 10 may execute a voltage control program to activate processes that perform the acceleration determination unit 21, the application controller 22, the insertion detector 23, the acoustic controller 24, and so forth, and may perform processes similar to those in the embodiments described above. This program may be distributed over a network such as the Internet. Additionally, this program may be executed in such a way that the program is recorded on a computer-readable recording medium such as a hard disk, a flexible disk (FD), a compact-disk read-only-memory (CD-ROM), a magneto-optical (MO), or a digital versatile disk (DVD) and the program is read from the recording medium by a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device including an insertion portion for insertion of a connection terminal, comprising:
    a memory; and
    a processor coupled to the memory, the processor configured to:
    detect an acceleration when the electronic device is moved,
    detect whether or not the connection terminal is inserted in the insertion portion, based on a potential of a connection line coupled with the insertion portion, the connection line maintaining coupling of a voltage source and the connection terminal when the connection terminal is inserted in the insertion portion,
    start coupling the voltage source and the connection line when the detected acceleration varies from a value less than a threshold to a value equal to or greater than the threshold, and
    stop coupling the voltage source and the connection line in response to the processor detecting the connection terminal is released from the insertion portion after starting the coupling of the voltage source and the connection line.

2. The electronic device according to claim 1, wherein a voltage level of the connection line while the connection terminal is released from the insertion portion is higher than a voltage level of the connection line while the connection terminal is inserted in the insertion portion.

3. The electronic device according to claim 1,
    wherein, at a given time interval after start of coupling of the voltage source and the connection line, the processor is configured to detect whether or not the connection terminal is inserted in the insertion portion, and
    wherein while, after start of coupling of the voltage source and the connection line, it is detected by the processor that the connection terminal is inserted in the insertion portion, the processor continues coupling the voltage source and the connection line.

4. The electronic device according to claim 1, wherein the processor is configured to stop the coupling of the voltage source and the connection line after a given period has passed since start of the coupling of the voltage source and the connection line.

5. A voltage control method performed by an electronic device including an insertion portion for insertion of a connection terminal, the voltage control method comprising:
    detecting an acceleration when the electronic device is moved;
    starting coupling of a voltage source and a connection line connected to the insertion portion when the detected acceleration varies from a value less than a threshold to a value equal to or greater than the threshold, the connection line maintaining coupling of the voltage source and the connection terminal when the connection terminal is inserted in the insertion portion;
    based on a potential of the connection line, detecting whether or not the connection terminal is inserted in the connection terminal; and
    stopping coupling the voltage source and the connection line in response to detection of the connection terminal being released from the insertion portion after starting the coupling of the voltage source and the connection line.

* * * * *